United States Patent [19]
Bowden

[11] 4,296,442
[45] Oct. 20, 1981

[54] ON-BOARD ANALOG REPRODUCER UNIT FOR OCEAN-BOTTOM SEISMOMETER

[75] Inventor: Edgar A. Bowden, Arlington, Tex.

[73] Assignee: Mobil Oil Corporation, New York, N.Y.

[21] Appl. No.: 140,354

[22] Filed: Apr. 14, 1980

[51] Int. Cl.³ .............................................. G11B 5/00
[52] U.S. Cl. ..................................................... 360/6
[58] Field of Search ........................... 360/6, 32, 51, 39

[56] References Cited

U.S. PATENT DOCUMENTS

| | | | |
|---|---|---|---|
| 3,419,853 | 12/1968 | Silverman | 340/172.5 |
| 3,535,501 | 12/1970 | Porter, Jr. | 235/156 |
| 4,138,658 | 2/1979 | Auedik et al. | 340/7 R |

FOREIGN PATENT DOCUMENTS 1550518  8/1979  United Kingdom .

OTHER PUBLICATIONS

"A Freefall Seismic Capsule for Seismicity & Retraction Work", by W. A. Prothero, Jr. Offshore Technology Conference May 3–6, 1976, Paper #OTC 2440.

"An Operationally Optimized Ocean–Bottom Seismometer Capsule", by W. A. Prothero, Jr., Univ. of Cal., S. B., Dept. of Com. NDAA Sea Grant 04-5-15-8-20, Pro. USDCR/E-15.

"MITOBS.", A Seismometer System for Ocean–Bottom Earth Quake Studies", by Mattaboni et al., 6/76, Draft Submitted to Marine Geophysical Researches.

"An Ocean–Bottom Seismograph Using Digital Telematry & Floating–Point Conversion", by Blackinrow et al., IEEE Trans. on Geo. Sc. Elect., vol. GE15 #2 4/77.

"Ocean–Bottom Seismic Observatories", by Sutton et al.,-Proc. IEEE vol. 53, #12 (12/65) by G. H. Sutton et al.

"A Buoyant Seismic Recording Apparatus for Use on the Ocean Bed", by R. B. Whitmarsh, IERE Conf. Proc. vol. 8 (1968), Paper #28.

"A Free–Fall Direct Recording Ocean–Bottom Seismograph", by S. H. Johnson et al., Marine Geophysical Researches, vol. 3, 1977, pp. 103–107.

"Automation of Observations & Preliminary Processing of Recordings at Ocean Bottom Seismograph During PSS in the Sea", by Neprochnou et al., Physics of the Solid Earth, vol. 13, #2, 1977, pp. 127–130.

"Ocean Bottom Seismograph", by Francis et al., Marine Geophysical Researches, vol. 2 (1975), pp. 195–213.

"A Direct Recording Ocean Bottom Seismometer", by Johnson, II, et al., Marine Geophysical Researches, vol. 3, 1977, pp. 65–85.

"Ocean Bottom Refraction Seismograph (OBRS)", by Avedik et al., Marine Geophysical Researches, vol. 3 (1978), pp. 357–379.

*Primary Examiner*—Vincent P. Ganney
*Attorney, Agent, or Firm*—Charles A. Huggett; Michael G. Gilman; George W. Hager

[57] ABSTRACT

An analog reproducer unit for a seismic exploration vessel includes a discriminator for checking the repetition rate of recorded strobe pulses to discriminate valid strobe pulses from noise. The valid strobe pulses are used to store digital samples in a digital memory. These digital samples are retrieved from a magnetic record produced in an on-bottom seismometer unit.

8 Claims, 7 Drawing Figures

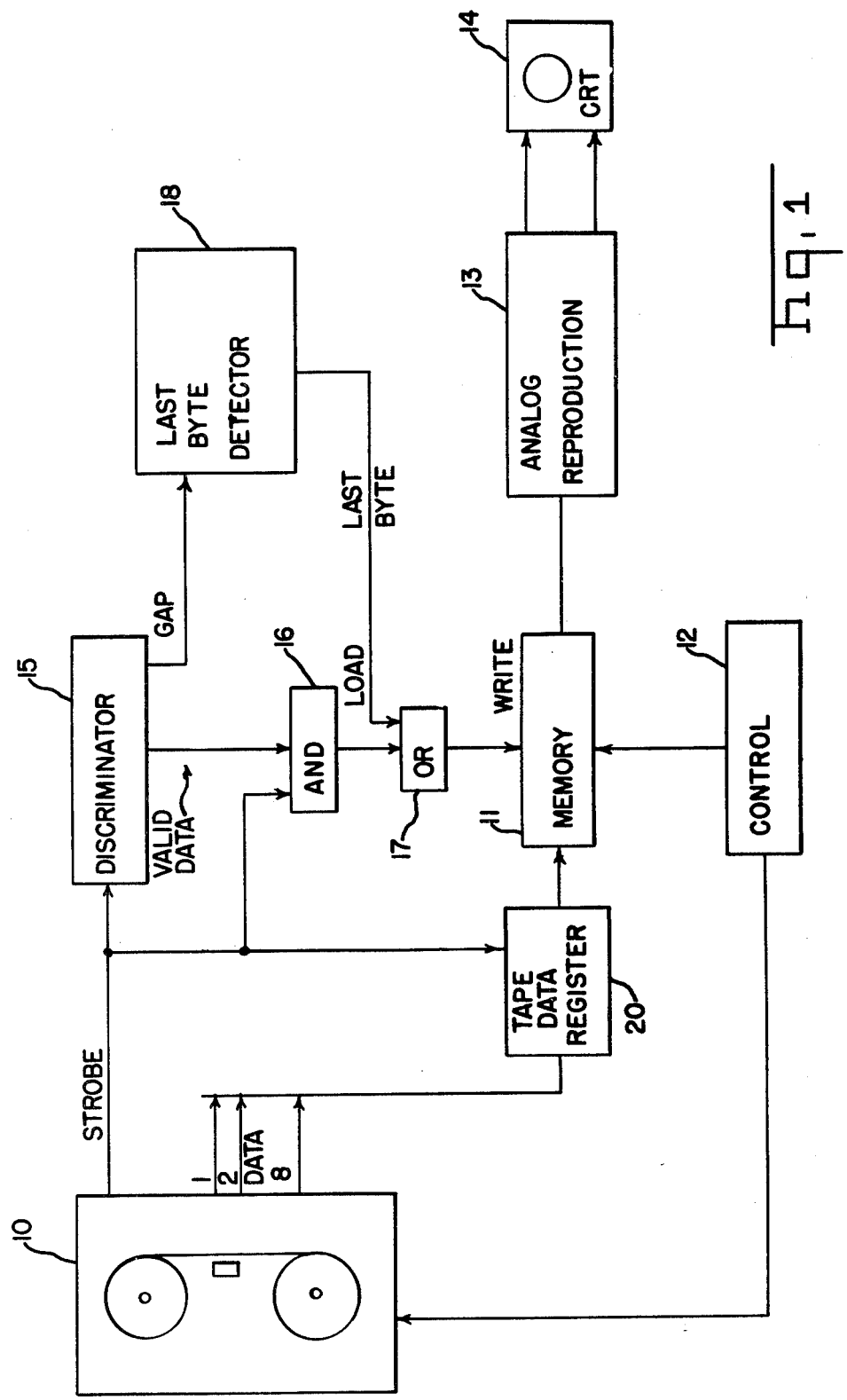

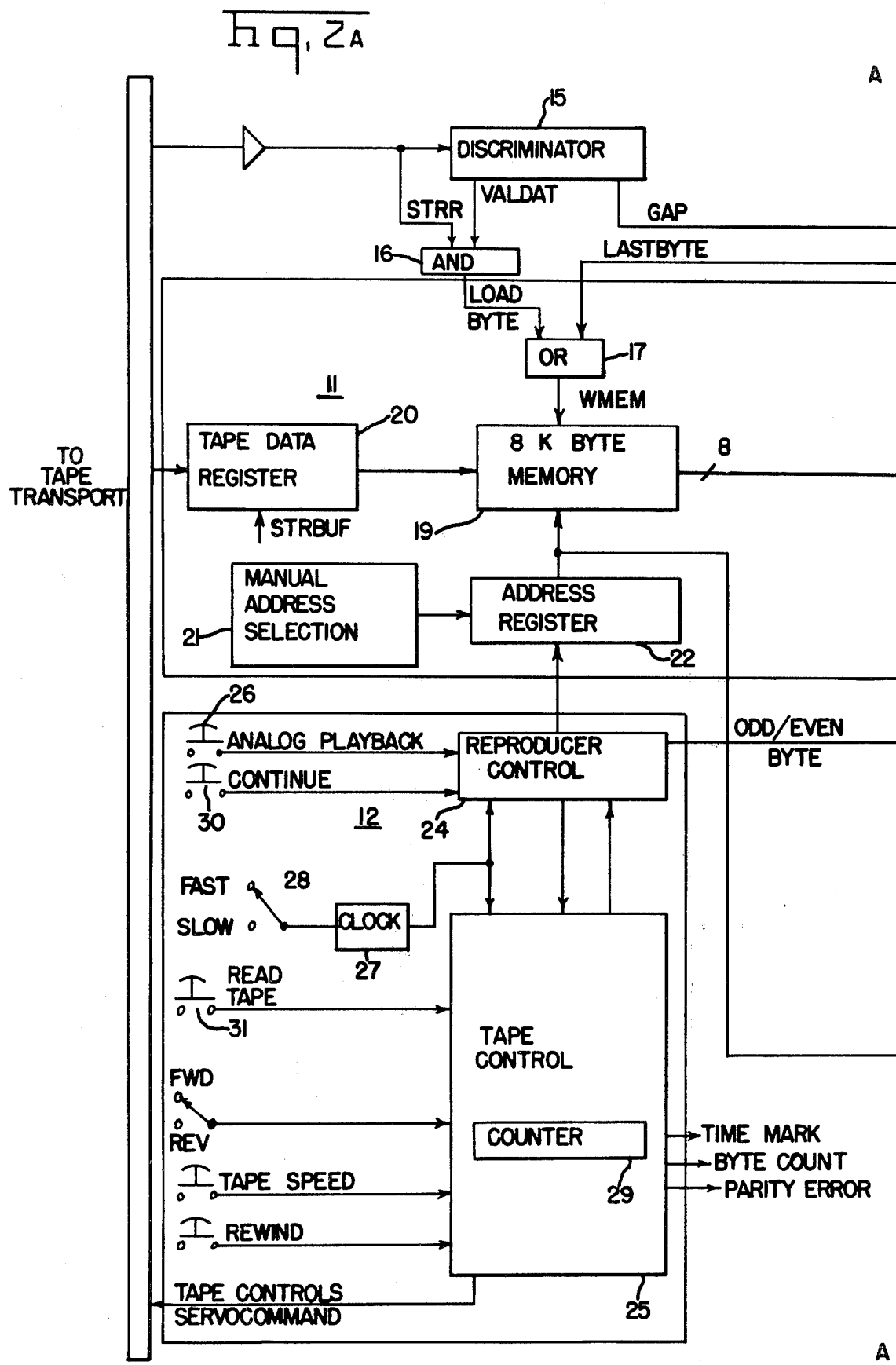

ON-BOARD ANALOG REPRODUCER UNIT FOR OCEAN-BOTTOM SEISMOMETER

BACKGROUND OF THE INVENTION

This invention relates to an analog reproducer unit for the exploration vessel which retrieves seismic records produced in an ocean-bottom seismometer.

T. J. G. Francis et al, "Marine Geophysical Researches" (1975), 195–213, describe three ways of retrieving seismic information from the ocean floor. A self-contained instrument may be attached by a rope to a surface ship or buoy; a transducer package may telemeter its data to a surface ship buoy or land station for recording; and a completely independent instrument of the "pop up" type may record data in its self-contained memory. The latter type instrument has been referred to as an on-bottom seismometer. These instruments have the advantage that they are easier to place on a particular bottom feature; the instrument is more secure from being tampered with than one which is connected to a surface buoy, and less system generated noise is associated with this type of instrument than one employing a mooring or a telemetry link.

Attempts to use ocean-bottom seismometers for refraction surveys have generally used a continuously running tape recorder to record the data. Avedik et al, "Ocean Bottom Refraction Seismograph (OBRS)", Marine Geophysical Researches 3 (1978), 357–379, describes an ocean bottom seismometer used for refraction surveys. In this system the seismic data are encoded with pulse width modulation. A tape recorder is set to start at a preset time. This tape recorder runs continuously at a very low speed to record the pulse width modulated data. U.S. Pat. No. 4,138,658—Avedik et al discloses and claims some features of this unit.

Johnson et al, "A Direct Recording Ocean Bottom Seismometer", Marine Geophysical Researches 3 (1977), 65–85, describes another system using a continuously running tape recorder.

RELATED APPLICATIONS

Co-pending application Ser. No. 163,757, filed June 27, 1980, On-Bottom Seismometer Electronic System, Bowden, DeLine and Koeijmans describes an on-bottom seismometer in which a tape recorder is started after the seismic energy has been digitized and recorded in solid state memory. Recording on the tape takes place during the time when seismograms are not being detected. This reduces noise in the seismograms and it reduces the amount of tape required to to record a given number of seismic records. The disclosure of that application is incorporated herein by reference.

When magnetic tapes containing such seismic records are retrieved from the on-bottom seismometer, it is desirable to immediately monitor the seismic records to determine if they have been properly recorded.

It is an object of the present invention to provide an analog reproduction unit for the exploration vessel which retrieves the on-bottom seismometer to provide the operator with a convenient means for monitoring the success of the seismic exploration conducted with the on-bottom unit.

Noise is a particular problem in any seismic exploration system. While the on-bottom seismometer described in the aforementioned co-pending application has successfully reduced the amount of noise present in the seismograms themselves, another noise problem has arisen because of the turning on and turning off of the tape recorder. Strobe pulses are recorded on magnetic tape concurrently with the recording of each digital sample on the tape. When the tape recorder is stopped, there is an inter-record gap on the tape which should contain no strobe pulse. However, it has been found that noise pulses in the inter-record gap and, in fact in the entire seismic record, sometimes produce pulses which the reproduction unit mistakenly identifies as strobe pulses.

Another object of the present invention is to provide an analog reproducer unit which discriminates between strobe pulses and noise reproduced from the magnetic tape so that proper reproduction of seismic records can be achieved.

SUMMARY OF THE INVENTION

In accordance with this invention, an analog reproducer unit for a seismic exploration vessel which retrieves magnetic records from an ocean bottom seismometer includes a discriminator for checking the repetition rate of the recorded strobe pulses to discriminate valid strobe pulses from noise. The valid strobe pulses are used to store in a digital memory digital samples reproduced from the magnetic record. When strobe pulses of the correct frequency, or period, are present each digital sample is stored in memory in response to the strobe pulse which is associated with the next occurring digital sample. The inter-record gap between seismic records is detected by the cessation of strobe pulses of the correct period. When this occurs, a signal is generated to load the last sample into memory. In this way, every sample in each record can be correctly stored in memory and then used to produce an analog signal which controls an analog reproduction device.

A digital to analog converter converts the digital samples from memory into an analog signal which is applied to a cathode ray tube device, or a plotter. These provide the operator with the capability of monitoring the success of the seismic exploration conducted with the ocean bottom seismometer.

In accordance with a feature of the present invention the horizontal synch signal for the cathode ray tube device is generated by converting the contents of the memory address register into an analog signal. The address register is incremented each time a digital sample is stored in the memory. By converting the contents of this address register into an analog signal, a ramp voltage is produced which changes to represent seismic record time.

The foregoing and other objects, features and advantages of the invention will be better understood from the following more detailed description and appended claims.

DETAILED DESCRIPTION OF THE DRAWINGS

FIG. 1 is a block diagram of the analog reproducer unit of this invention;

FIGS. 2A and 2B show the memory, analog reproduction and control portions of FIG. 1 in more detail;

FIG. 5A shows the start pulse which initiates the reading of a record;

FIG. 5N shows a write memory cycle.

DESCRIPTION OF THE PREFERRED EMBODIMENT

Figure 2B:
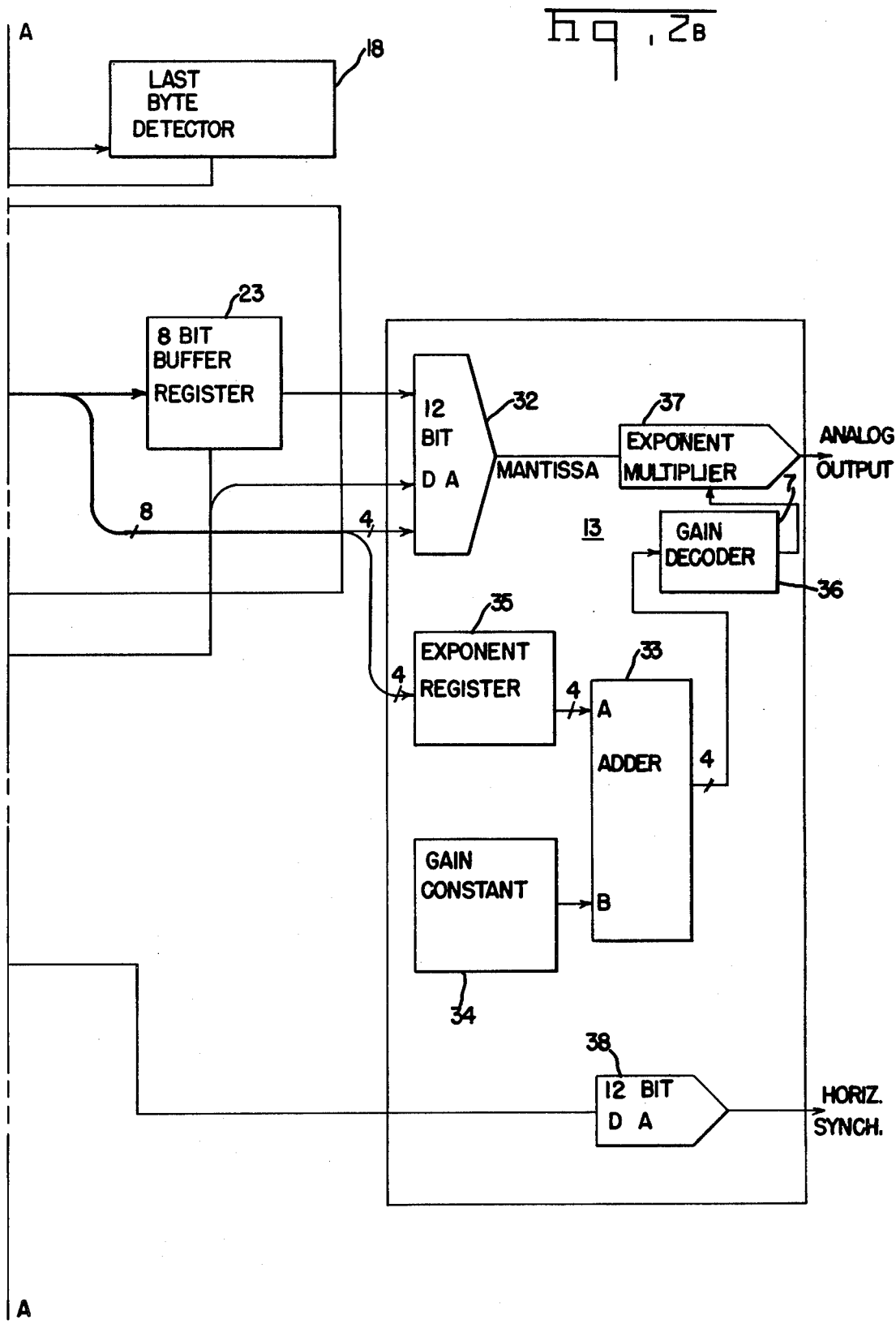

The analog reproducer unit shown in FIG. 1 is installed on a seismic exploration vessel which retrieves ocean bottom seismometers. The ocean bottom seismometer units described in the aforementioned Bowden, DeLine and Koeijmans application record seismic records on magnetic tape contained in cartridges. A magnetic tape reproducer unit 10 plays back these magnetic tapes.

FIG. 9 of the aforementioned Bowden et al application shows the tape recorder and recording system for recording these tapes. Each of the digital samples is recorded as a nine bit word which includes 8 bits of data (0-7) (one byte) and one parity bit. For each byte a strobe pulse is generated within the tape reader. When played back, the strobe pulses indicate the time of occurrence of each of the digital bytes on the tape. As shown in FIG. 10 of that application, seismograms are recorded in digital words which include 2 bytes. A first, or odd, byte has 8 bits of the mantissa. A second, or odd, byte has 4 bits of the mantissa, and 4 bits of exponent which designates the gain of the seismic signal recorded.

The digitized seismograms reproduced from the tape unit 10 are transferred first to the tape data register 20 and then are stored in the digital memory 11. Magnetic tape reproduction unit 10 and memory 11 are under control of the control circuitry 12. Digital samples are read out of memory 11 to the analog reproduction circuitry 13 which includes a digital to analog converter for converting the digital samples into an analog signal. This analog signal is applied to an analog reproduction device such as the cathode ray tube display device 14. Alternatively, an XY plotter may be used as the analog display device. In either case, the seismic records are displayed so that an operator can monitor the operation of the ocean bottom seismometer used to record these seismograms.

In accordance with the present invention, strobe pulses reproduced from the magnetic tape are applied to a discriminator 15 which checks the repetition rate of the strobe pulses to discriminate valid strobe pulses from noise. Discriminator 15 produces a VALID DATA signal when a valid strobe can be expected, and it produces a GAP signal when the inter-record gap is detected. The VALID DATA signal is applied to gating means which includes AND gate 16. AND gate 16 responds to the VALID DATA signal and to the strobe pulses to produce a LOAD MEMORY signal which passes through OR gate 17 to store a digital sample in memory 11 upon the occurrence of the strobe pulse associated with the next occurring digital sample. [False strobes occurring at times other than VALID DATA, are rejected by gate 16.] The loading of samples into memory is always one sample behind the reading of the sample from the tape and the reading of the strobe pulse associated therewith, because the data are temporarily stored in an 8 bit buffer register (x,y). Because of this delay, a last byte detector 18 produces an extra WRITE signal so that the last sample in each record is transferred from the buffer to memory. Last byte detector 18 responds to GAP signal from discriminator 15. When an inter-record gap is detected, the last byte pulse is produced to store the last sample into memory. The memory 11, control 12, and analog reproduction circuitry 13 are shown in more detail in FIG. 2.

Memory 11 accepts data bytes according to the aforementioned time discrimination. If the next byte occurs at the proper time, a valid data stream is assumed and the data is transferred to 8K byte memory 19. While the validity is being considered the byte is held in temporary data register 20.

Seismic records in the 8K byte memory 19 can be displayed for monitoring purposes by selecting the beginning address of that record by means of the manual address selection switches 21. These set an address into the address register 22 which controls the readout from memory 19. As previously discussed, it is read in 8 bit groups, where the first 8 bits are the high order portion of the 12 bit mantissa, and the second 8 bits are the least significant portion of the mantissa and 4 bits of gain ranging. It is necessary to line the two 8 bit groups up into a 16 bit group, hence an 8 bit buffer register 23 holds the first group while the next group is being accessed. Then the 16 bits are simultaneously transferred to analog reproduction circuitry 13.

The control circuitry 12 includes reproducer control circuitry 24 and tape control circuitry 25.

Figure 3:
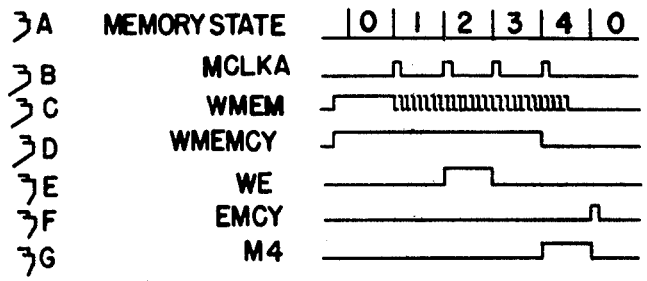
FIGS. 3A through 3G depict the sequence for a typical write memory cycle.

Tape control logic 25 starts the reading of a magnetic tape when the read tape switch 31 is actuated. This starts the reading of a single seismic record of up to 8,192 bytes which are read from the magnetic tape cartridge in the playback unit. At the beginning of the read cycle, the memory address in register 22 is set to location zero and a tape servo command is issued. Strobe pulses are received from the playback unit as each data byte is read by the tape recorder. FIGS. 3A-3G show the sequence for a typical write memory cycle which transfers these data bytes to memory 19. The timing depends on the clock 27 and the mode of operation. The clock can run as fast as 500 kHz in the write mode or as slow as 500 Hz in the slow replay mode. Clock pulses are counted and decoded into five states 0, 1, 2, 3 and 4 (FIG. 3A). A write cycle is initiated by WMEM (FIG. 3C) which produces WMEMCY (FIG. 3D) on the leading edge of WMEM. This enables gating circuitry which produces the clock pulses MCLKA (FIG. 3B). The pulses clear the memory sequencer to state zero. Write Enable WE (FIG.

3E) is true during state 2. Data is transferred to memory 19 on the trailing edge of WE. State M4 (FIG. 3G) changes the address and EMCY (FIG. 3F) clears the state counter to state zero.

Reproducer control 24 in FIG. 2 receives commands from the operator and controls the flow of data from memory 19 to the analog reproducer circuitry 13. A display is initiated by the operator actuating the analog playback switch 26. This sets the address register 22 to the location specified in the address selection switches 21. A time base clock 27 is started at a speed specified by the fast slow switch 28. As each byte is read from memory 19, the address register 22 is incremented and a time interval counter 29 is decremented. When the time mark counter 29 reaches zero, a time mark is produced. Address register 22 is advanced two locations to bypass the time code written into memory at those two locations and the time mark counter 29 is reloaded. This process continues until an address counter advances to the number of bytes which had originally been transferred to memory 19. At this point, the reproduction of a seismic trace ceases, unless the continue switch 30 is depressed causing a cyclic repetition of the same seismic trace. Tape reading is initiated by the START TAPE READ signal STR (FIG. 5A) which is produced in response to the tape read switch 31 (FIG. 2). When STR goes low, it produces the signal S/RDTP (FIG. 5B) which enables the tape servo command. The signal READ TAPE signal RDTP (FIG. 5C) is up for the entire period of the seismic record.

Now refer to the analog reproduction circuitry 13 in FIG. 2. A 12 bit digital to analog converter 32 converts the mantissa of each two byte sample into an analog. At this stage, the mantissa contains scaling information imposed by the auto gain ranging circuit in the ocean bottom seismometer. The lower levels of the signal are scaled up by several gain steps. By reversing the gain ranging process, a signal of the original shape and amplitude can be constructed from the analog mantissa. The geophone signals are typically in the microvolt region. While the shape is a feature desirable to retain, the amplitude becomes difficult to deal with because of noise and instrument sensitivity. Hence, the magnitude is scaled by subtracting a constant from the exponent, which effectively multiplies the mantissa by a factor of two for each step in the constant subtracted. The scaling information remaining on the mantissa is removed by multiplying the mantissa by two raised to the modified exponent. This is accomplished by circuitry which includes an adder 33 for summing the gain constant stored in register 34 with the exponent bits, denoting gain, and stored in register 35. Decoder 36 produces a decoded gain signal. Multiplier 37 is a precision digital to analog multiplier. It attenuates the mantissa from digital to analog converter 32 by the weight of the decoded gain signal.

In order to produce a signal representing record time, a second 12 bit digital to analog converter 38 converts the output of address register 22 into a ramp voltage which changes as the address register 22 is incremented. This technique does not produce an impeccable time base signal, but it is adequate for the intended purpose and it provides a particularly convenient technique for producing a time base signal. The time base signal is applied to the horizontal synch circuit when a CRT is employed as the analog display device.

Figure 4A:
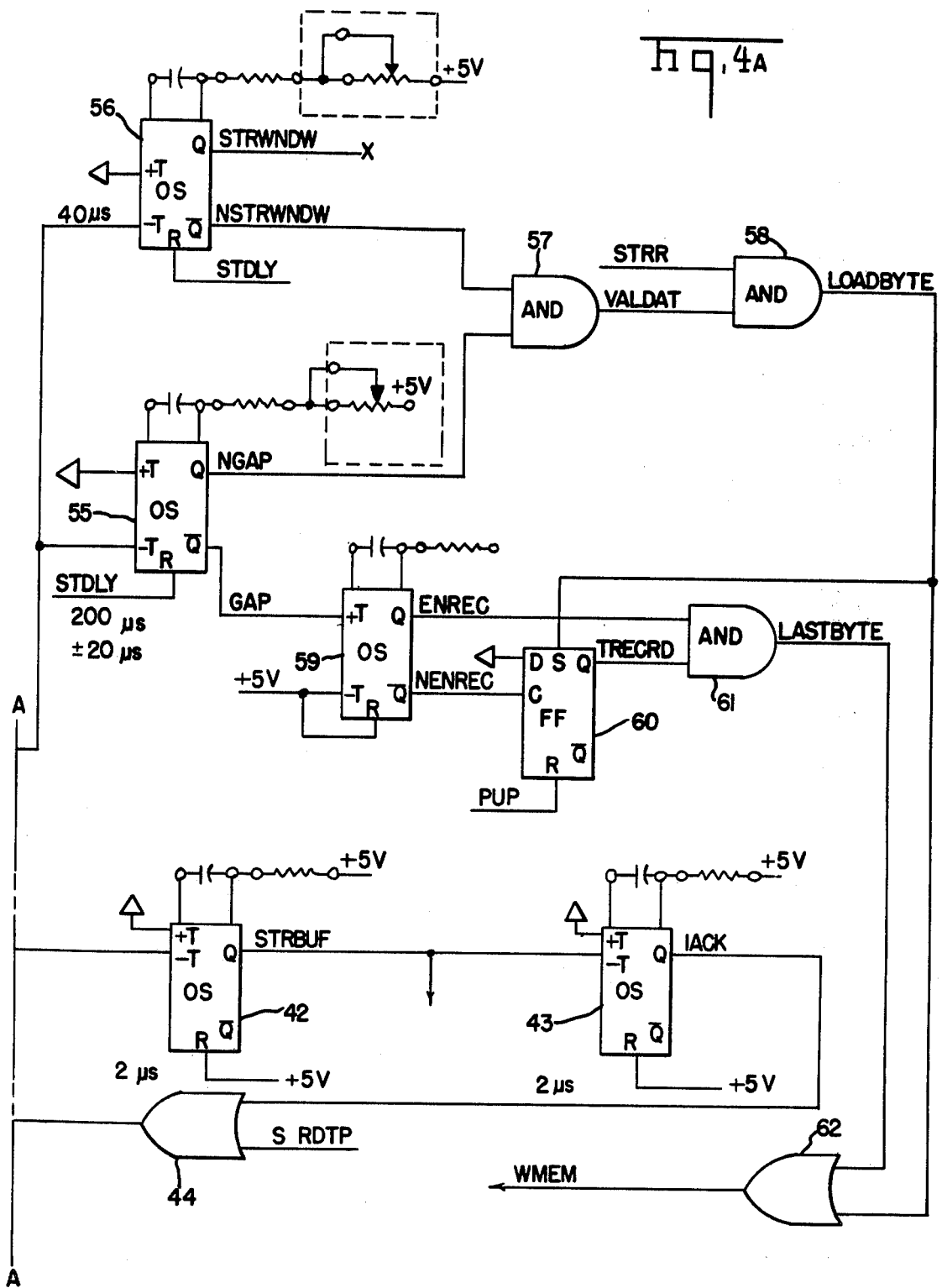
FIGS. 4A and 4B show the discriminator and last byte detector of this invention.
Figure 4B:
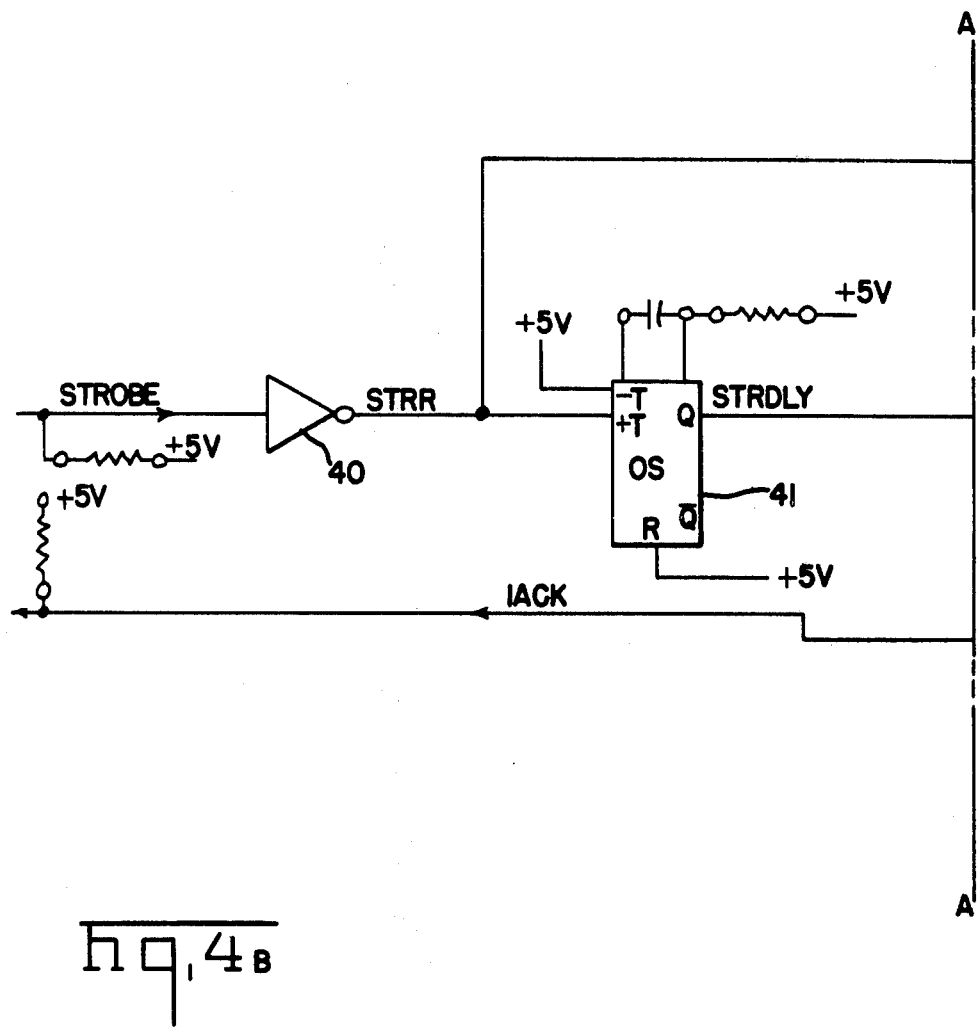

FIG. 4 shows the circuitry which transfers data bytes from tape to memory. It also shows the circuitry of the discriminator 15 and the last byte detector 18 (FIG. 1).

Figure 5:
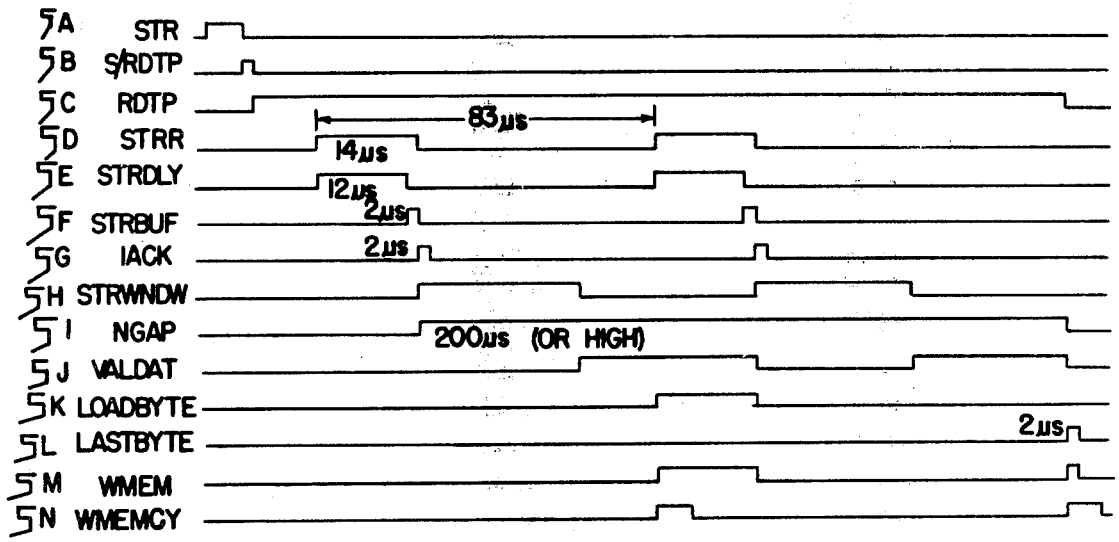
FIGS. 5A through 5N are waveforms which depict the operation of the system, namely.
FIG. 5B shows the signal which starts the reading of the tape.
FIG. 5C shows the signal which is up during the entire reading of a seismic record.
FIG. 5D shows the strobe pulse received signal.
FIG. 5E shows the strobe delay signal which occurs for 12 microseconds after the occurrence of a strobe received signal.
FIG. 5F shows the signal which transfers a byte from the tape transport to the temporary storage register 20.
FIG. 5G shows the signal acknowledging receipt of a byte.
FIG. 5H shows a strobe window signal.
FIG. 5I shows the signal which is up when the tape is not being read in the inter-record gap.
FIG. 5J shows a signal which is up during the period when a valid strobe pulse can occur.
FIG. 5K shows the signal which loads data bytes into the memory.
FIG. 5L shows the extra load memory pulse which is produced at the end of a record.
FIG. 5M shows the write memory signal.

The strobe pulses from the tape unit fire the Schmidt trigger 40 which produces the strobe received signal STRR (FIG. 5A). This fires the one shot multivibrator 41 which has an astable period of 12 microseconds which is the duration of the strobe delay signal STRDLY (FIG. 5E). This signal causes a data byte to be strobed into the temporary tape data register 20 (FIG. 2). Reception of the byte is acknowledged by generation of the signal IACK (FIG. 5G). This signal is produced by the one shot multivibrator 43 and gating circuitry including OR gate 44. This acknowledgement signal is returned to the magnetic playback unit. The process of reading and acknowledging is repeated until no further input ready signals are received from the playback unit.

As previously mentioned, the repetition rate of the strobe signals STRR is used as a criterion for detecting valid strobe trains. If the strobe pulses occur too frequently (less than 40 microseconds apart) or too far apart (more than 200 microseconds) the pulse train is assumed to be noise and the data is not transferred to memory. In order to accomplish this, a one shot multivibrator 55 has an astable period which is approximately 2.5 times greater than the period of the strobe pulses. An astable period of approximately between 2 and 3 times the period of the strobe pulse would accomplish this function. In the example under consideration the strobe pulses have a period of 83 microseconds and one shot multivibrator 55 has an astable period of 200 microseconds. One shot multivibrator 55 is retriggered by each succeeding strobe pulse so that the multivibrator remains triggered during reception of the valid strobe pulses, that is strobe pulses of the correct period. When strobe pulses of the correct period are being received, the signal NGAP is up, thereby indicating that samples are being read from the record and that the tape is not in the inter-record gap.

The one shot multivibrator 56 determines when the strobe pulses are within the tolerance specified for the particular tape transport. In this case, that tolerance is 60–105 microseconds. One shot multivibrator 56 has an astable period which is a significant portion of the period of the strobe pulses. In this case, the astable period is 60 microseconds. Upon being triggered by a strobe pulse, the one shot multivibrator 56 produces a strobe window strobe STRWNDW (FIG. 5HI). This signal terminates just prior to the expected time of the next strobe pulse. AND gate 57 detects the coincidence of the signal NSTRWNDW with the signal NGAP. This occurs only when the strobe repetition rate is within the given tolerance. In this case, AND gate 57 produces a valid data signal VALDAT (FIG. 5J). When this signal is up, the subsequently occurring strobe pulses STRR pass through AND gate 58 to produce a memory load signal which stores a digital sample in the memory. This signal is designated LOAD BYTE (FIG. 5K). At the end of the record, the signal STRR ceases to occur. The one shot multivibrator 55 times out, thus producing the signal GAP indicating in inter-record gap. This triggers the one shot multivibrator 59 which produces the end of record signal ENREC. Flip flop 60 is clocked by one shot multivibrator 59 200 microseconds after the reception of the last valid strobe pulse. The coincidence of this with the end record signal is detected in AND gate 61. This produces the signal LAST BYTE which passes through OR gate 62. This produces an final memory load signal WMEM (FIG. 5A). This final memory load signal transfers the last sample in each record into memory in response to the occurrence of a GAP signal.

While a particular embodiment has been shown and described, modifications are within the true spirt and scope of the invention. The appended claims, are, therefore, intended to cover all such modifications.

What is claimed is:

1. In a marine exploration seismic exploration system wherein an ocean bottom seismometer unit deployed on the ocean bottom records digitized seismograms on a magnetic medium which is retrieved so that the recorded seismograms can be analyzed, an analog reproducer unit for installation on the exploration vessel which retrieves said magnetic medium comprising:
   a magnetic reproducer unit for reproducing said digitized seismograms recorded on said magnetic medium;
   a digital memory for storing digital samples reproduced from said medium;
   digital to analog converter means for converting said digital samples into an analog signal;
   an analog reproduction device for displaying said analog signal so that an operator can monitor said seismograms;
   means for producing strobe pulses indicating the time of occurrence of the recording of a digital sample on said medium;
   a discriminator for checking the repetition rate of said strobe pulses to discriminate valid strobe pulses from noise; and
   gating means responsive to said discriminator and to said strobe pulses for storing said digital samples in said memory only when a valid detection of strobe pulses is obtained.

2. The analog reproducer unit recited in claim 1 wherein said record medium is a magnetic tape produced on a tape recorder which is started to record said digital samples in refraction records and wherein said tape contains inter-record gaps between said records during which the tape recorder in said ocean bottom seismometer was stopped, said discriminator being responsive to the repetition rate of said strobe pulses to produce a valid data signal only during the reproduction of said seismic records; and
   gating means responsive to said valid data signal and responsive to said strobe pulses for producing a memory load signal which stores a digital sample in said memory upon the occurrence of the strobe pulse associated with the next occurring digital sample.

3. The analog reproducer unit recited in claim 2 wherein said discriminator produces a GAP signal during reproduction of the inter-record gap between said seismic records; and
   a last sample detector responsive to said GAP signal producing a final memory load signal so that the last sample in each record is written into memory in response to the occurrence of a GAP signal.

4. The analog reproducer unit recited in claim 1 wherein said discriminator comprises:
   a one shot multivibrator having an astable period which is approximately between two and three times greater than the period of said strobe pulses, said monostable multivibrator being triggered by each succeeding strobe pulse so that said multivibrator remains triggered during reception of strobe pulses of the correct period; and
   AND gate circuitry, said strobe pulses and the output of said monostable multivibrator being applied to said AND gate circuitry said digital samples being loaded into said memory in response to the output of said AND gate.

5. The analog reproducer unit recited in claim 4 wherein said discriminator further comprises:
   a second monostable multivibrator having an astable period which is a significant portion of the period of said strobe pulses, said second astable multivibrator being triggered by said strobe pulses so that it generates a window signal which starts at each strobe pulse and terminates just prior to the expected time of the next strobe pulse, said window signal being applied to said AND gate circuitry to disable said circuitry from passing a strobe pulse before the expected time of arrival of said strobe pulse.

6. The analog reproducer unit recited in claim 1 further comprising:
   an address register for said memory, said address register being incremented each time a digital sample is stored in said digital memory; and
   second digital to analog converter means for converting the output of said address register into a ramp voltage which changes as said address register is incremented to produce a signal representing record time.

7. The analog reproducer unit recited in claim 6 wherein said analog reproduction device is a cathode ray tube display device wherein the output of said first analog to digital converter controls the y deflection and the output of said second digital to analog converter means controls the x deflection of said cathode ray tube display.

8. The analog reproducer unit recited in claim 1 wherein each digital sample includes a plurality of bits denoting the gain of the analog signal represented by said digital sample;
   means for summing a stored digital representation of gain to said bits denoting gain;
   a decoder, the output of said adder being applied to said decoder to produce a decoded gain signal; and
   an attenuator, the output of said first digital to analog converter means being attenuated by the weight of said decoded gain signal in said attenuator.

* * * * *